United States Patent [19]

Dorain et al.

[11] Patent Number: 5,026,160
[45] Date of Patent: Jun. 25, 1991

[54] MONOLITHIC OPTICAL PROGRAMMABLE SPECTROGRAPH (MOPS)

[75] Inventors: Paul B. Dorain, South Hadley, Mass.; Judith B. Snow, Branford, Conn.

[73] Assignee: The United States of America as represented by the Secretary of the Navy

[21] Appl. No.: 417,623

[22] Filed: Oct. 4, 1989

[51] Int. Cl.$^5$ .............................................. G01J 3/18
[52] U.S. Cl. .................................................. 356/328
[58] Field of Search ............... 356/300, 326, 328, 331, 356/332, 334; 350/96.18, 96.19

[56] References Cited

U.S. PATENT DOCUMENTS

| | | | |
|---|---|---|---|
| 4,652,080 | 3/1987 | Carter et al. | 350/96.19 |
| 4,744,618 | 5/1988 | Mahlein | 350/96.19 |
| 4,815,806 | 3/1989 | Owen | 350/96.18 |
| 4,838,645 | 6/1989 | Machler et al. | 350/96.19 |

FOREIGN PATENT DOCUMENTS

| | | | |
|---|---|---|---|
| 6320 | 1/1980 | Japan | 356/328 |
| 87925 | 7/1980 | Japan | 356/300 |

Primary Examiner—F. L. Evans
Attorney, Agent, or Firm—Michael J. McGowan; Prithvi C. Lall

[57] ABSTRACT

A solid monolithic spectrograph utilizes the Czerny-Turner geometric configuration. It has a base constructed of BK7 optical glass to which all components are affixed with optical epoxy. The compact spectrograph operates in the visible spectrum in second order thereby permitting it to be smaller by a factor of two than if it operated in first order. The spectrograph is programmable and is capable of simultaneous multichannel measurements of wavelengths and bandwidths of sources in the visible and near infrared spectral regions.

5 Claims, 1 Drawing Sheet

INPUT FIBER

MONOLITHIC OPTICAL PROGRAMMABLE SPECTROGRAPH (MOPS)

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to the measurement of the wavelengths, bandwidths, and intensities of optical radiation. More particularly the invention fills the need for a compact rugged, vibration resistant spectrograph for use in the field or in harsh environments.

(2) Description of the Prior Art

Typical prior art spectral measurements were made with spectrometers that measured the intensity of an optical source at only one wavelength at a time. Measurement at other wavelengths or measurement of the bandwidth of a spectral line, required physically moving the diffraction grating. With improved detector technology, spectrographs utilizing linear photodiode arrays can simultaneously measure the intensities at multiple wavelengths. Consequently, the spectral intensities and bandwidths of an optical source can be obtained simultaneously. The disadvantages of these prior technologies include susceptibility to misalignment, vulnerability to optical and mechanical component damage, the requirement for expensive precision mechanical components, and relatively large size.

SUMMARY OF THE INVENTION

The Monolithic Optical Programmable Spectrograph (MOPS) is a rugged, vibration resistant, inexpensive, compact spectrograph. It is capable of simultaneous multi-channel measurements of wavelengths and bandwidths of sources in the visible light and near infrared spectrums and has a resolution more than sufficient to resolve the near infrared 1060 nm wavelengths in the first order from the optical wavelengths 454, 472, 488, 496, 514, and 532 nm in the second order. The MOPS has sufficient linear space at the exit focal plane to accommodate a standard linear diode array package. This means that the wavelength dispersion is sufficient so that the wavelengths of interest are spread over about two centimeters. The spectrograph uses a grating with a large number of grooves/mm blazed to scatter light in second order. This enables the spectrograph to be smaller by a factor of two than if the grating were operating in first order. The MOPS utilizes the favorable geometry for the spectrograph that is afforded by the Czerny-Turner geometric configuration. It is constructed of BK7 optical glass for rigidity. The glass is relatively hard and can be handled without special precautions. The MOPS has all components affixed to the base by optical epoxy. This method of attaching components reduces vibration problems and misalignment common in other spectrographs.

DESCRIPTION OF THE PREFERRED EMBODIMENT

Figure 1:
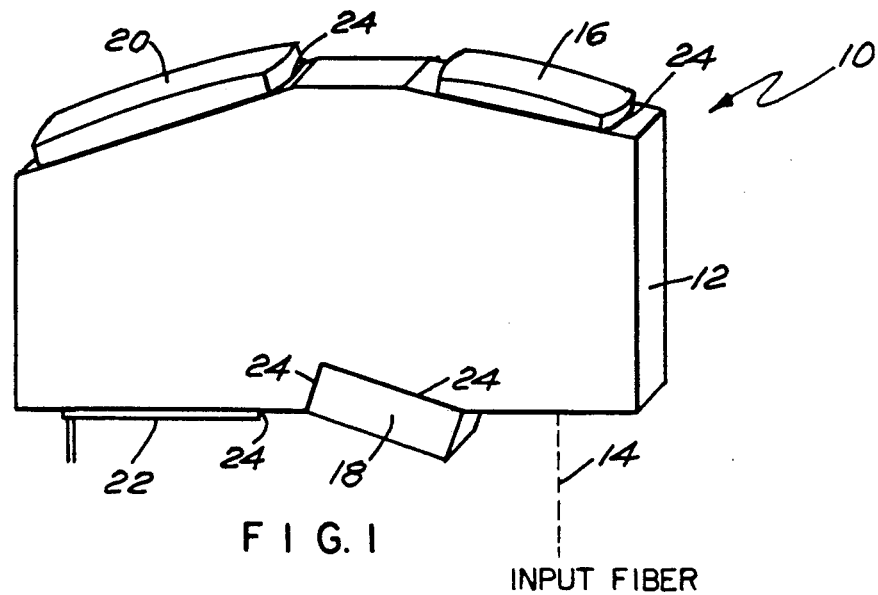
FIG. 1 is a pictorial representation of the MOPS assembly in accordance with the present invention.

Referring now to the figures there is shown a spectrograph 10 called MOPS. The spectrograph 10 is both compact and portable having overall dimensions of 5 cm×8.5 cm×2.5 cm. The resolution and dispersion parameters are not those generally obtainable in larger spectrographs used for scientific purposes, but they are adequate for many applications, especially where ruggedness and physical size are important considerations.

The spectrograph 10 is comprised of a base 12, input fiber optic bundle 14, input mirror 16, grating 18, output mirror 20, and a programmable linear diode array 22. The input fiber optic bundle 14, input mirror 16, grating is, output mirror 20, and array 22 are all affixed to the base 12 with index matching glue 24.

In operation a beam enters the base 12 from fiber optic bundle 14. The beam is then reflected and collimated by input mirror 16 onto diffraction grating 18. The diffracted light from grating 18 is collected by output mirror 20 and focused by output mirror 20 onto array 22.

Figure 2:
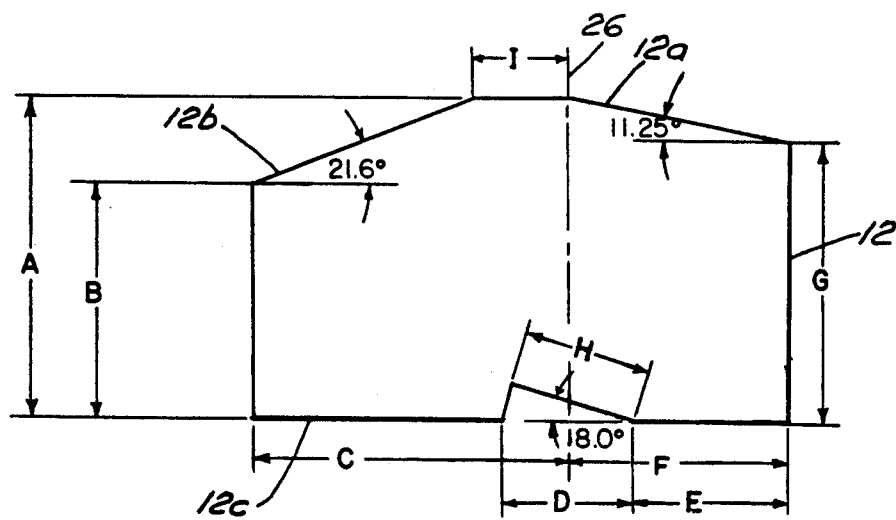
FIG. 2 shows a front view of the glass monolith appearing in FIG. 1.

The base 12 is a monolithio glass component made from BK7 optical glass. It has a relatively high index of refraction (1.51) over the wavelengths of interest. The glass is relatively hard and can be handled without special precautions. It has a very low bubble content and excellent transmittance down to 350 nm. The glass surfaces of the base 12 are as ground with the exception that surfaces 12a, 12b and 12c are finished. The surfaces 12a, 12b and 12c are polished to 80-50. The angles and linear dimensions A-I are as shown in FIG. 2 with the angles held to a tolerance of 0.5 degrees Linear dimensions A-I may be in any desired units but in the preferred embodiment they are in centimeters with a tolerance of 0.020 cm excluding the thickness where the tolerance is not as critical. For the preferred embodiment A=5.00, B=3.60, C=5.00, D=2.10, E=2.50, F=3.50, G=4.30, H=2.00 and I=1.47 centimeters respectively. All non-polished surfaces are painted with optically black paint.

The mirrors 16 and 20 are made from commercially available plano convex lenses of BK7 glass. The spherical sides are overcoated with aluminum and magnesium fluoride for air protection. The radius of curvature for both mirrors 16 and 20 is 10.0 cm. The diameter of the input mirror 16 is 25.4 mm and 38.10 mm for the output mirror 20. They are affixed to the glass polished surfaces 12a and 12b with index matching glue 24 so that the centers of the respective mirrors 16 and 20 are 2.07 cm to the right and at 3.82 cm to the left of the reference line 26 shown in FIG. 2. In these positions the 50 mm focal length mirrors 16 and 20 focus On the bottom surface of the base 12.

The grating 18 is a 25 mm×25 mm grating with 1200 grooves/mm grating blazed for 750 nm. The grating 18 is affixed with index or index of refraction matching glue 24 in the notch on the lower surface of the base 12 so that the blaze is toward the left of the figures. This assures that the intensity of the diffracted light scattered toward the large collection mirror 20 is maximized. Without the proper glue, the scattered wavelengths will be at incorrect angles.

The input optic fiber bundle 14 is affixed with index matching glue 24 to the glass at a position 2.07 cm to the right of the reference line 26 of FIG. 2. For maximum resolution of the spectra, it is desirable to have the width of the fiber bundle, or alternately a slit, to be less than 0.2 mm.

There are several commercially available detector systems from which to choose that can be affixed to the base 12 with index matching glue 24. These include a programmable linear diode array 22 which provides simultaneous multi-channel processing of the input received from an optical source. It is a self-scanning device mounted in a standard 22 pin integrated package having 1024 diodes that are illuminated through a polished quartz window. The diodes are each 25 $\mu m \times 2.5$ mm and each is spaced 25 $\mu m$ from its neighbors. Thus the dead space in the spatial sensitivity curve is minimized. The spectral response ranges from 200 to 1000 nm with a broad peak at about 700 nm. A saturation charge of 14 pcoul for a single diode corresponds to $8.8 \times 10$; electrons. The calculated quantum efficiency is 0.75% at 700 nm.

The index matching glue 24 used to attach components to base 12 must have an index of refraction approximately equal to that of the BK7 glass. The index of refraction of BK7 glass is 1.51.

There has therefore been described a spectrograph 10 utilizing a modified Czerny-Turner design to generate the desired dispersion pattern for a programmable linear diode array system 22. The features of this design, which distinguish it from a basic Czerny-Turner, are the base 12 construction, method of attaching the external components, and the geometry of the dispersion pattern. The base 12 of the spectrograph 10 is constructed of a solid piece of BK7 optical glass for rigidity, whereas the basic Czerny-Turner design is a configuration utilizing a metal base and an air path conductor. The method of attaching components to the base 12 of the spectrograph 10 with index matching glue 24 reduces vibration and misalignment problems common in other Czerny-Turner spectrographs because in the prior art configurations the components are mounted to the base using a combination of mountings and mechanical fasteners.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A spectrograph comprising:
   a solid transparent base, said base made of BK7 glass and painted optically black on non-transmitting surfaces, formed in a Czerny-Turner configuration;
   input means for providing input rays to said base;
   an input mirror affixed to said base and positioned so as to receive and reflect said input rays;
   a grating affixed to said base and positioned so as to receive said reflected rays from said input mirror and to disperse said rays in a diffraction pattern;
   an output mirror affixed to said base and positioned so as to receive said diffraction pattern and to reflect and focus said diffraction pattern into a diffraction spectrum;
   a photodiode detector array affixed to said base for receiving and processing said diffraction spectrum; and
   optical index of refraction matching glue affixing said input mirror, said grating, said output mirror, and said photodiode detector array to said base.

2. A spectrograph according to claim 1 wherein said input means comprises a slit.

3. A spectrograph according to claim 2 wherein said base, said slit, said input mirror, said grating, said output mirror and said photodiode detector array are configured and aligned so that said photodiode detector array receives a second order spectrum.

4. A spectrograph according to claim 1 wherein said input means comprises optic fiber.

5. A spectrograph according to claim 4 wherein said base, said optic fiber, said input mirror, said grating, said output mirror and said photodiode detector array are configured and aligned so that said photodiode detector array receives a second order spectrum.

* * * * *